United States Patent
Shen et al.

(10) Patent No.: US 12,271,379 B2
(45) Date of Patent: Apr. 8, 2025

(54) CROSS-DATABASE JOIN QUERY

(71) Applicant: International Business Machines Corporation, Armonk, NY (US)

(72) Inventors: Hai Jun Shen, Tianjin (CN); Chang Sheng Liu, Haidian (CN); Jun Hui Liu, Xi'an (CN); Ying Qi Pan, Beijing (CN); Liam Loucks, Calgary (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/348,400

(22) Filed: Jul. 7, 2023

(65) Prior Publication Data
US 2025/0013643 A1    Jan. 9, 2025

(51) Int. Cl.
*G06F 16/2453*   (2019.01)
*G06F 11/34*     (2006.01)
*G06F 16/2455*   (2019.01)
*G06F 16/25*     (2019.01)

(52) U.S. Cl.
CPC .... *G06F 16/24544* (2019.01); *G06F 11/3409* (2013.01); *G06F 16/24561* (2019.01); *G06F 16/256* (2019.01)

(58) Field of Classification Search
CPC ......... G06F 16/24544; G06F 16/24561; G06F 16/256; G06F 11/3409
USPC ....................................................... 707/718
See application file for complete search history.

(56) References Cited

U.S. PATENT DOCUMENTS

| | | | |
|---|---|---|---|
| 7,454,462 B2 | 11/2008 | Belfiore | |
| 9,582,221 B2 | 2/2017 | Du | |
| 10,592,562 B2 | 3/2020 | Pal | |
| 11,354,312 B2 | 6/2022 | Liu | |
| 2011/0258179 A1 | 10/2011 | Weissman | |
| 2014/0188841 A1 | 7/2014 | Sun | |
| 2019/0303475 A1* | 10/2019 | Jindal | G06F 16/24545 |
| 2020/0073986 A1* | 3/2020 | Purcell | G06F 16/21 |
| 2021/0224275 A1* | 7/2021 | Maheshwari | G06N 3/044 |
| 2021/0342351 A1* | 11/2021 | Mathew | G06F 16/24544 |

(Continued)

OTHER PUBLICATIONS

Jiang, "Optimizing join query in distributed database", A Capstone Project (or Thesis) Submitted to the University of North Carolina Wilmington in Partial Fulfillment of the Requirements for the Degree of Master of Science, 2011, 78 pages.

(Continued)

*Primary Examiner* — Syed H Hasan
*Assistant Examiner* — Nicholas E Allen
(74) *Attorney, Agent, or Firm* — Michael A. Petrocelli

(57) ABSTRACT

A data virtualization layer (DV) receives a join query request related to a plurality of tables respectively stored in a plurality of distributed database servers. A plurality of candidate query plans for the join query request is generated where each of the plurality of candidate query plans indicates an order for transmitting the tables respectively stored in the database servers to the DV. For each of the plurality of candidate query plans, a query cost for the candidate query plan is calculated based on a data amount of the tables to be transmitted according to the candidate query plan. From the plurality of candidate query plans, a query plan is determined for the join query request which has a lowest query cost.

20 Claims, 4 Drawing Sheets

(56) References Cited

U.S. PATENT DOCUMENTS

2022/0300491 A1* 9/2022 Gruszecki ............ G06F 16/2393
2022/0374404 A1* 11/2022 Johnson .................. H03M 7/30

OTHER PUBLICATIONS

Kang, "Global query management in heterogeneous distributed database systems", Microprocessing and Microprogramming, vol. 38, (1993), pp. 377-384.

Karpathiotakis et al., "Fast queries over heterogeneous data through engine customization", Proceedings of the VLDB Endowment, vol. 9, No. 12, pp. 972-983.

Ran Tan et al., "Enabling Query Processing across Heterogeneous Data Models: A Survey", 2017 IEEE International Conference on Big Data (Big Data), Published Date: Dec. 14, 2017, 10 pages.

* cited by examiner

CROSS-DATABASE JOIN QUERY

BACKGROUND

The present invention relates to database technology, and more specifically, to cross-database join query.

Data may be stored in different database servers which are physically located in different places, and there may be requirements for fetching data distributed stored in the database servers with a cross-database join query. A data virtualization layer coupled with the database servers may be used to perform the cross-database join query. The data virtualization layer may be used to access, manage, integrate and aggregate data from the databases independent from its physical location or format in real-time.

SUMMARY

According to one embodiment of the present invention, there is provided a computer-implemented method. The method may comprise receiving at a data virtualization layer (DV), by one or more processors, a join query request related to a plurality of tables $\{T_1, T_2, \ldots, T_n\}$ respectively stored in a plurality of distributed database servers $\{S_1, S_2, \ldots, S_n\}$, wherein n is an integer larger than 1. The method may further comprise generating, by the one or more processors, a plurality of candidate query plans for the join query request, each of the plurality of candidate query plans indicating an order for transmitting the tables $\{T_1, T_2, \ldots, T_n\}$ respectively stored in the database servers $\{S_1, S_2, \ldots, S_n\}$ to the DV, wherein for one candidate query plan $P=\{S_i \rightarrow S_j \rightarrow \ldots S_n \rightarrow, \ldots, \rightarrow DV\}$, $1 \le i, j \le n$, table $T_i$ stored in database server $S_i$ is transmitted to and stored in database server $S_j$ before being transmitted together with table $T_j$ which is stored in database server $S_j$ to a next database server, and wherein in at least one of the database servers $\{S_1, S_2, \ldots, S_n\}$, a join work is performed on the stored tables based on the join query request before being transmitted to the next database server. The method may further comprise for each of the plurality of candidate query plans, calculating, by the one or more processors, a query cost for the candidate query plan based on a data amount of the tables to be transmitted according to the candidate query plan. The method may further comprise determining, by the one or more processors, from the plurality of candidate query plans, a query plan for the join query request which has a lowest query cost.

According to another embodiment of the present invention, there is provided a system which may comprise one or more processors and a memory coupled to at least one of the one or more processors. The system may comprise a set of computer program instructions stored in the memory and executed by at least one of the one or more processors in order to perform an action of receiving, at a data virtualization layer (DV), a join query request related to a plurality of tables $\{T_1, T_2, \ldots, T_n\}$ respectively stored in a plurality of distributed database servers $\{S_1, S_2, \ldots, S_n\}$, wherein n is an integer larger than 1. The system may comprise a set of computer program instructions stored in the memory and executed by at least one of the one or more processors in order to perform an action of generating a plurality of candidate query plans for the join query request, each of the plurality of candidate query plans indicating an order for transmitting the tables $\{T_1, T_2, \ldots, T_n\}$ respectively stored in the database servers $\{S_1, S_2, \ldots, S_n\}$ to the DV, wherein for one candidate query plan $P=\{S_i \rightarrow S_j \rightarrow \ldots S_n \rightarrow, \ldots, \rightarrow DV\}$, $1 \le i, j \le n$, table $T_i$ stored in database server $S_i$ is transmitted to and stored in database server $S_j$ before being transmitted together with table $T_j$ which is stored in database server $S_j$ to a next database server, and wherein in at least one of the database servers $\{S_1, S_2, \ldots, S_n\}$, a join work is performed on the stored tables based on the join query request before being transmitted to the next database server. The system may comprise a set of computer program instructions stored in the memory and executed by at least one of the one or more processors in order to perform an action of for each of the plurality of candidate query plans, calculating a query cost for the candidate query plan based on a data amount of the tables to be transmitted according to the candidate query plan. The system may comprise a set of computer program instructions stored in the memory and executed by at least one of the one or more processors in order to perform an action of determining from the plurality of candidate query plans, a query plan for the join query request which has a lowest query cost.

According to a further embodiment of the present disclosure, there is provided a computer program product. The computer program product may comprise a computer readable storage medium having program instructions embodied therewith. The program instructions may be executable by a device to perform a method. The method may comprise receiving, at a data virtualization layer (DV), a join query request related to a plurality of tables $\{T_1, T_2, \ldots, T_n\}$ respectively stored in a plurality of distributed database servers $\{S_1, S_2, \ldots, S_n\}$, wherein n is an integer larger than 1. The method may further comprise generating a plurality of candidate query plans for the join query request, each of the plurality of candidate query plans indicating an order for transmitting the tables $\{T_1, T_2, \ldots, T_n\}$ respectively stored in the database servers $\{S_1, S_2, \ldots, S_n\}$ to the DV, wherein for one candidate query plan $P=\{S_i \rightarrow S_j \rightarrow \ldots S_n \rightarrow, \ldots, \rightarrow DV\}$, $1 \le i, j \le n$, table $T_i$ stored in database server $S_i$ is transmitted to and stored in database server $S_j$ before being transmitted together with table $T_j$ which is stored in database server $S_j$ to a next database server, and wherein in at least one of the database servers $\{S_1, S_2, \ldots, S_n\}$, a join work is performed on the stored tables based on the join query request before being transmitted to the next database server. The method may further comprise for each of the plurality of candidate query plans, calculating a query cost for the candidate query plan based on a data amount of the tables to be transmitted according to the candidate query plan. The method may further comprise determining from the plurality of candidate query plans, a query plan for the join query request which has a lowest query cost.

According to the present application, network throughput of the data virtualization layer may be reduced and the query performance of the cross-database join query may be increased.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
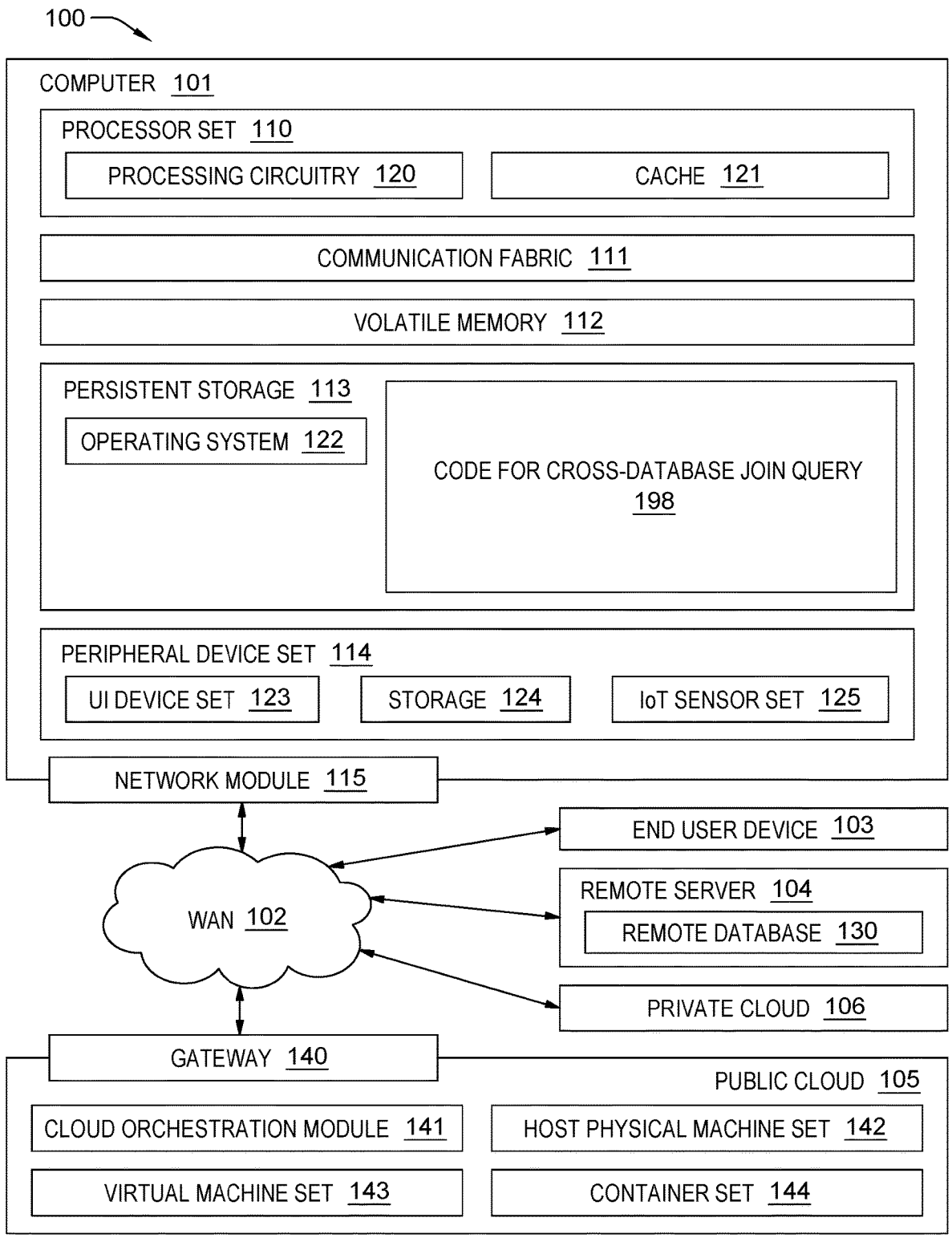
FIG. 1 shows an exemplary computing environment which is applicable to implement the embodiments of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as code for cross-database join query 198. In addition to block 198, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 198, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 198 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 198 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

It is understood that the computing environment 100 in FIG. 1 is only provided for illustration purpose without suggesting any limitation to any embodiment of this invention, for example, at least part of the program code involved in performing the inventive methods could be loaded in cache 121, volatile memory 112 or stored in other storage (e.g., storage 124) of the computer 101, or at least part of the program code involved in performing the inventive methods could be stored in other local or/and remote computing environment and be loaded when need. For another example, the peripheral device 114 could also be implemented by an independent peripheral device connected to the computer 101 through interface. For a further example, the WAN may be replaced and/or supplemented by any other connection made to an external computer (for example, through the Internet using an Internet Service Provider).

With reference now to FIGS. 2~6, some embodiments of the present disclosure will be described below.

Figure 2:
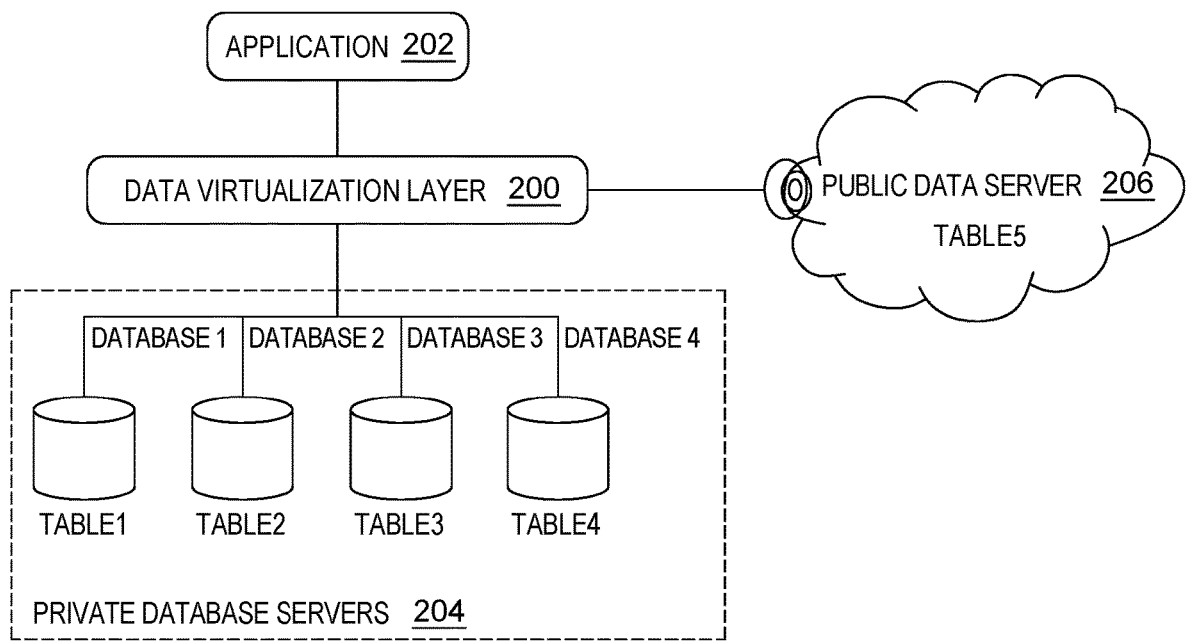
FIG. 2 shows an exemplary diagram of a data virtualization layer and a plurality of database servers to which the embodiments of the present invention may be applied.

FIG. 2 shows an exemplary diagram of a data virtualization layer 200 and a plurality of database servers 204 and 206 to which the embodiments of the present invention may be applied.

As shown in FIG. 2, a plurality of database servers are coupled to the data virtualization layer 200, including private database servers 204 and a public database server 206. Examples of private database servers 204 may include but not limited to Oracle, MySQL, PostgreSQL, SQL Server, etc. Examples of the public database server 206 may include but not limited to AWS, Azure, Aliyun, etc. FIG. 2 shows four disparate private database servers, i.e., databases 1~4, and one public database server as an example, but the number of the coupled database servers is not limited to the example shown in FIG. 2. Further, each database server may store tables with its own format. As shown in FIG. 2, four tables 1~4 are respectively stored in databases 1~4, while table 5 is stored in the one public database server 206.

The application 202 may include artificial intelligence (AI) based application, business intelligence (BI) based application or any other kinds of applications. An operation on the application 202 by a user may trigger a query request for data stored in the databases. The query request may be sent through the application 202 to the data virtualization layer 200. The data virtualization layer 200 may query and fetch necessary data from the coupled database servers in response to the query request. Further, since different database servers may have different data storage formats and query syntaxes, the data virtualization layer 200 may translate the query request from the application 202 before sending it to corresponding database servers.

Figure 3:
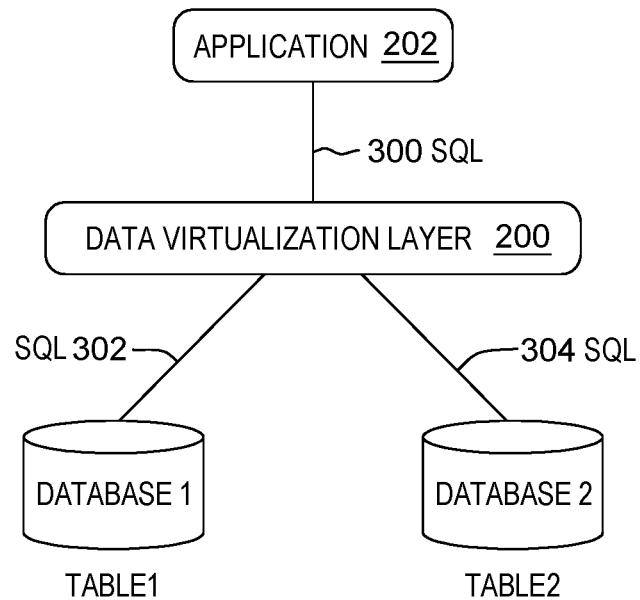
FIG. 3 shows an exemplary diagram of a cross-database join query performed by the data virtualization layer of FIG. 2.

Now refer to FIG. 3, an exemplary cross-database join query performed by the data virtualization layer 200 is further described.

A cross-database join query described herein means a query related to at least two tables stored in different database servers. In the following description, unless otherwise indicated, the join query herein means the cross-database join query.

A join query request may be generated by the application 202 in response to the operation on the application 202 by a user. Further, the join query request may be sent to the data virtualization layer 200 by using SQL (Structured Query Language) 300 for example. Further, the join query request may be indicated by an operator "join" in SQL 300. To join more than one table, at least one column common in both tables is needed. Tables may get joined based on the join query request.

Assuming the join query request is to query an academic grade of a student A. The join query request is included in SQL 300 and sent by the application 202 to the data virtualization layer 200. In the data virtualization layer 200, the join query request is analyzed to determine that this join query relates to tables 1 and 2, wherein table 1 is a student table recording names, IDs, ages, home addresses, etc. of all students in a school, and table 2 is an academic grade table recording IDs and academic grades of the students. Further, tables 1 and 2 are respectively stored in distributed databases 1 and 2. The common column in table 1 and table 2 is IDs of the students, so table 1 and 2 may get joined to query the academic grade of a student A.

In order to perform the join query of querying an academic grade of a student A, the data virtualization layer 200 may generate an SQL 302 for fetching table 1 from database 1, and an SQL 304 for fetching table 2 from database 2. Then, a join work on table 1 and table 2 may be performed in the data virtualization layer 200 to obtain the data required in the join query, i.e., the academic grade of student A.

As can be seen from the example of FIG. 3, two separate SQLs (e.g., SQL 302 and SQL 304) are needed for fetching required tables across different database servers. Further, two times of data transmission from the two databases 1 and 2 are required. Accordingly, the network throughput of the data virtualization layer may be large and the query performance of the cross-database join query may be low.

Therefore, there is a need to provide a cross-database join query scheme which may reduce the network throughput and increase the query performance.

Now refer to FIG. 4, the cross-database join query according to some embodiments of the present invention will be described.

Stilling using the example described with respect to FIG. 3, that is, the join query is to query the academic grade of the student A. Further, the tables 1 and 2 and the databases 1 and 2 in FIG. 4 are the same as those described in FIG. 3.

Figure 4:
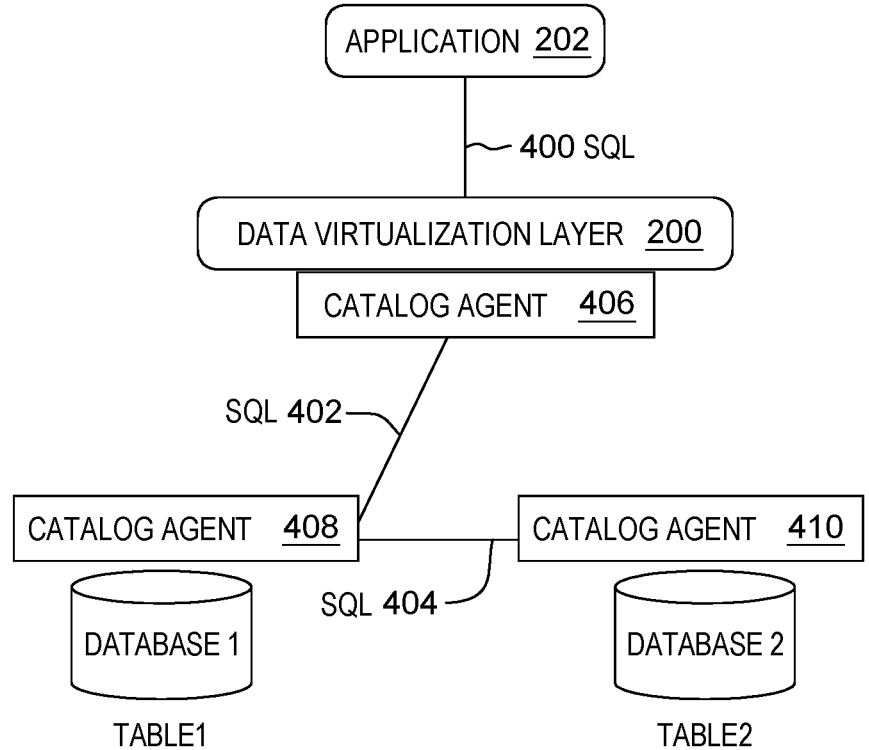
FIG. 4 shows an exemplary diagram of a cross-database join query according to some embodiments of the present invention.

As shown in FIG. 4, application 202 issues a join query request with SQL 400 for querying the academic grade of the student A to data virtualization layer 200.

Next, different from directly sending respective SQLs to databases 1 and 2 in the case of FIG. 3, in FIG. 4, the data virtualization layer 200 generates candidate query plans for the join query request. Each candidate query plan indicates an order for transmitting the tables 1 and 2 respectively stored in the databases 1 and 2 to the DV.

For example, for the case of FIG. 4, the following three candidate query plans $P_1$, $P_2$ and $P_3$ may be generated.

$P_1$={database 1→DV, database 2→DV},
$P_2$={database 1→database 2→DV},
$P_3$={database 2→database 1→DV},
wherein DV denotes the data virtualization layer 200.

The candidate query plan $P_1$ indicates that table 1 from database 1 and table 2 from database 2 are separately transmitted to DV, which is the same as the join query described with reference to FIG. 3.

The candidate query plan $P_2$ indicates that table 1 from database 1 is firstly transmitted to database 2, a join work is to be performed on table 1 and table 2 in database 2, and then the joined data is transmitted to DV.

The candidate query plan $P_3$ indicates that table 2 from database 2 is firstly transmitted to database 1, a join work is to be performed on table 2 and table 1 in database 1, and then the joined data is transmitted to DV.

Next, query costs for the three candidate query plans are calculated to choose a query plan for the join query request with a lowest query cost.

In some embodiments, the query cost may be determined based on a data amount of the tables to be transmitted. For example, assuming that the data amount of table 1 (the student table) is 1 MB, while the data amount of table 2 (the academic grade table) is 10 KB.

For candidate query plan $P_1$, the data amount for transmitting table 1 to DV is 1 MB, and the data amount for transmitting table 2 to DV is 10 KB. Therefore, the total data amount of the tables to be transmitted is 1 MB+10 KB=1034 KB.

For candidate query plan $P_2$, the data amount for transmitting table 1 to database 2 is 1 MB. In database 2, tables 1 and 2 are joined according to the join query of querying an academic grade of a student A. After the join work, the join query may correspond to one row of data which records the academic grade of the student A. The data amount after the join work may be 1 KB to be transmitted to DV. Therefore, the total data amount of the tables to be transmitted is 1 MB+1 KB=1025 KB.

For candidate query plan $P_3$, the data amount for transmitting table 2 to database 1 is 10 KB. In database 1, tables 1 and 2 are joined according to the join query of querying an academic grade of a student A. After the join work, the join query may correspond to one row of data which records the academic grade of the student A. The data amount after the join work may be 1 KB to be transmitted to DV. Therefore, the total data amount of the tables to be transmitted is 10 KB+1 KB=11 KB.

By comparing the query costs of candidate query plans $P_1$, $P_2$ and $P_3$, the candidate query plan $P_3$ with the lowest query cost may be chosen as the query plan for the join query request. For example, as shown in FIG. 4, an SQL 402 may be sent by the data virtualization layer 200 to database 1 indicating the query plan $P_3$, and the database 1 may parse the SQL 402 and generate an SQL 404 to database 2 to fetch table 2. After fetching table 2 from database 2, database 1 may perform the join work of tables 1 and 2 based on the SQL 402, before transmitting data back to the data virtualization layer 200.

In contrast, in the cross-database join query shown in FIG. 3, the data amount of tables to be transmitted is 1 MB+10 KB=1034 KB (the same as the candidate query plan $P_1$), because no join work is to be performed in databases 1 and 2, the tables are directly fetched from databases 1 and 2, and the join work is performed at the data virtualization layer 200.

In addition, in the cross-database join query shown in FIG. 4, only one time of data transmission from the databases 1 and 2 to DV is required and thus the transmission time between database servers and DV is reduced compared to the case shown in FIG. 3 in which two times of data transmission are required.

Accordingly, based on the cross-database join query according to some embodiments of the present invention described with reference to FIG. 4, the network throughput may be reduced, and the query performance may be increased.

It is noted that SQLs are described as an example of query statements, while other query statements with other syntax may be used for the cross-database join query of the present disclosure according to actual needs.

In FIG. 4, cross-database join query for tables stored in two distributed database servers is describe. It is noted that the cross-database join query is not limited to the join query of two distributed database servers, but may be similarly applied to the join query on multiple database servers. The details may be described with reference to FIG. 5.

Figure 5:
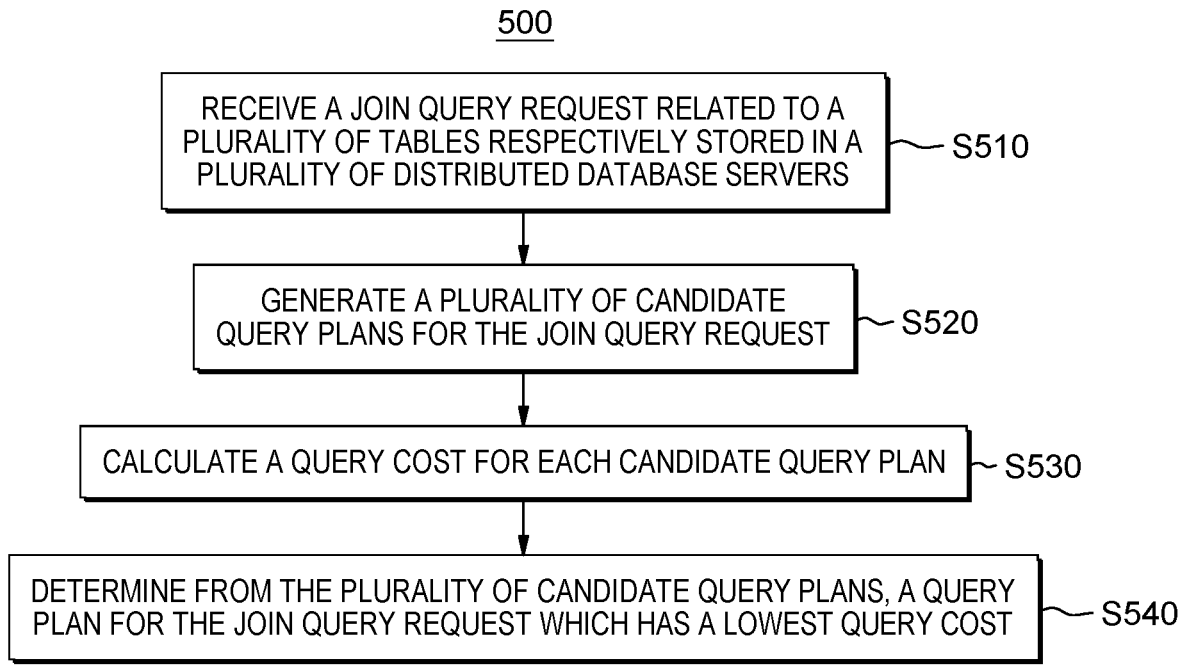
FIG. 5 shows a flow chart of an exemplary method for the cross-database join query according to some embodiments of the present invention.

FIG. 5 shows a flow chart of an exemplary method 500 for the cross-database join query according to some embodiments of the present invention.

In some embodiments, in S510, one or more processors may receive, at a data virtualization layer (DV), a join query request related to a plurality of tables $\{T_1, T_2, \ldots, T_n\}$. The tables $\{T_1, T_2, \ldots, T_n\}$ may be respectively stored in a plurality of distributed database servers $\{S_1, S_2, \ldots, S_n\}$. Further, n is an integer larger than 1, indicating the number of distributed database servers. It is noted that table $T_i$ is not limited to one table, but may also indicate a plurality of tables stored in database server $S_1$. The same also applies to other tables $T_2, \ldots, T_n$. Further, tables 1 and 2 in FIG. 4 may be an example of the tables $\{T_1, T_2, \ldots, T_n\}$, and databases 1 and 2 may be an example of the database servers $\{S_1, S_2, \ldots, S_n\}$, in the case that n equals 2.

In some embodiments, in S520, the one or more processors may generate a plurality of candidate query plans for the join query request, each of the plurality of candidate query plans indicating an order for transmitting the tables $\{T_1, T_2, \ldots, T_n\}$ respectively stored in the database servers $\{S_1, S_2, \ldots, S_n\}$ to the DV. In the case that n equals 2, exemplary candidate query plans may be $P_1$. $P_2$ and $P_3$ described above.

In some embodiments, for one candidate query plan $P=\{S_i \rightarrow S_j \rightarrow \ldots S_n \rightarrow, \ldots, \rightarrow DV\}$. $1 \leq i, j \leq n$, table $T_i$ stored in database server $S_i$ is transmitted to and stored in database server $S_j$ before being transmitted together with table $T_j$ which is stored in database server $S_j$ to a next database server. The same applies to other tables stored in other database servers based on the order indicated in the candidate query plan P.

Further, for the candidate query plan P, in at least one of the database servers $\{S_1, S_2, \ldots, S_n\}$, a join work is performed on the stored tables based on the join query request before the stored tables being transmitted to the next database server. For example, for the candidate query plan $P_2$, a join work is performed on tables 1 and 2 in database 2, before the tables being transmitted to DV. Further, for the candidate query plan $P_3$, a join work is performed on tables 1 and 2 in database 1, before the tables being transmitted to DV.

Further, the candidate query plan may also include $\{S_1 \rightarrow DV \ldots, S_i \rightarrow DV, \ldots, S_j \rightarrow DV, \ldots, S_n \rightarrow DV\}$, which corresponds to the cross-database join query of FIG. 3 or the candidate query plan $P_1$ described in FIG. 4. In this case, the join work is performed in DV. For example, for the candidate query plan $P_1$, a join work is performed on the data virtualization layer 200.

In S530, the one or more processors may calculate, for each of the plurality of candidate query plans, a query cost for the candidate query plan based on a data amount of the tables to be transmitted according to the candidate query plan. For example, the query costs $C_1$, $C_2$ and $C_3$ of the candidate query plans $P_1$, $P_2$ and $P_3$ may be respectively determined based on the data amounts of tables to be transmitted.

In S540, the one or more processors may determine from the plurality of candidate query plans a query plan for the join query request which has a lowest query cost. For example, the candidate query plan $P_3$ having the lowest query cost is determined as the query plan for the join query request.

Accordingly, the candidate query plan with a lowest data transmission amount may be chosen as the query plan for the join query request, and thus the network throughput may be reduced, and the query performance may be increased.

In some embodiments, the data amount of the tables to be transmitted is determined based on statistic information of the tables $\{T_1, T_2, \ldots, T_n\}$. Statistic information of a table $T_i$ may describe characteristics of the table $T_i$, including but not limited to the size, columns, rows, index of the table $T_i$. In some embodiments, the statistic information may be obtained by using a syntax "STATISTICS" for the table. In some embodiments, the statistic information of the tables $\{T_1, T_2, \ldots, T_n\}$ may be respectively obtained from the database servers $\{S_1, S_2, \ldots, S_n\}$. That is, each database server stores the statistic information of its own table, and the data virtualization layer 200 may fetch the statistic information from respective database server in response to the join query request. In some other embodiments, the statistic information may be obtained by the data virtualization layer 200 from the database servers in advance periodically for example.

In some embodiments, in S530, in addition to the data amount, the query cost for the candidate query plan may be further calculated based on a processing rate of the database servers $\{S_1, S_2, \ldots, S_n\}$. The processing rate may have an impact on transmission rate for the required data to the data virtualization layer 200, and thus may also be taken into consideration when calculating the query cost, so as to improve the query efficiency.

In some embodiments, the processing rate of a database server may be determined by performance information of the database server. Further, the performance information may be indicated by at least one of a CPU status, a memory status, a disk utilization.

In some embodiments, the processing rate may be determined by performance information of the at least one of the database servers $\{S_1, S_2, \ldots, S_n\}$ in which the join work is performed. Since the join work may be resource-consuming and thus may become a major factor affecting the processing rate. By considering the processing rate of the database servers in which the join work is performed, the query cost may be calculated more accurately.

For example, although candidate query plan $P_3$ has a lower data transmission amount than candidate query plan $P_2$, if the processing rate of database 1 (in which the join work is performed for candidate query plan $P_3$) is extremely lower than the processing rate of database 2 (in which the join work is performed for candidate query plan $P_2$), the query cost for candidate query plan $P_2$ may become lower than the query cost for candidate query plan $P_3$, and the candidate query plan $P_2$ may be chosen as the final query plan.

In some embodiments, the data virtualization layer 200 may obtain the performance information from respective database server in response to the join query request. In some other embodiments, the performance information may be obtained by the data virtualization layer 200 from the database servers in advance periodically for example.

In some embodiments, weights may be set to the data amount and the processing rate to calculate the query cost. The weights may be determined according to actual needs. Further, in some embodiments, a cost model may be used to calculate the query cost with parameters including statistic information, performance information (such as CPU status, memory status, disk utilization, etc.) as input to the cost model, and query cost as output of the cost model.

In some embodiments, network latencies may also be taken into consideration when calculating the query cost, so as to improve the query efficiency. Specifically, in S530, the query cost for the candidate query plan may be further calculated based on network latencies for transmitting the tables $\{T_1, T_2, \ldots, T_n\}$ respectively stored in the database servers $\{S_1, S_2, \ldots, S_n\}$ to the DV based on the candidate query plan.

For example, although candidate query plan $P_3$ has a lower data transmission amount than candidate query plan $P_2$, if the network latency between database 1 to DV is extremely larger than the network latency between database 2 and DV, the query cost for candidate query plan $P_2$ may be calculated as lower than the query cost for candidate query plan $P_3$, and the candidate query plan $P_2$ may be chosen as the final query plan.

In some embodiments, weights may be set to at least two of the data amount, the processing rate, and the network latencies to calculate the query cost. The weights may be determined according to actual needs.

Further, in some embodiments, a cost model may be used to calculate the query cost with parameters including statistic information, performance information (such as CPU status, memory status, disk utilization, etc.) of the local database server performing the join work, together with network latencies with remote database servers and DV and performance information of the remote database servers as input to the cost model, and query cost as output of the cost model.

In some embodiments, after determining the final query plan, in the method 500, the one or more processors may fetch data related to the join query request based on the determined query plan. For example, a proper SQL may be generated and sent to the database servers based on the determined query plan for fetching the data related to the join query request. Accordingly, the fetched data may be provided by the data virtualization layer 200 to the application 202.

The above embodiments have described a query plan optimization of one single join query request. In some embodiments, for a plurality of join query requests, the method 500 may also be applied, by treating the plurality of join query requests as one whole join query request, to perform a global optimization to generate an optimized query plan for the plurality of join query requests.

Figure 6:
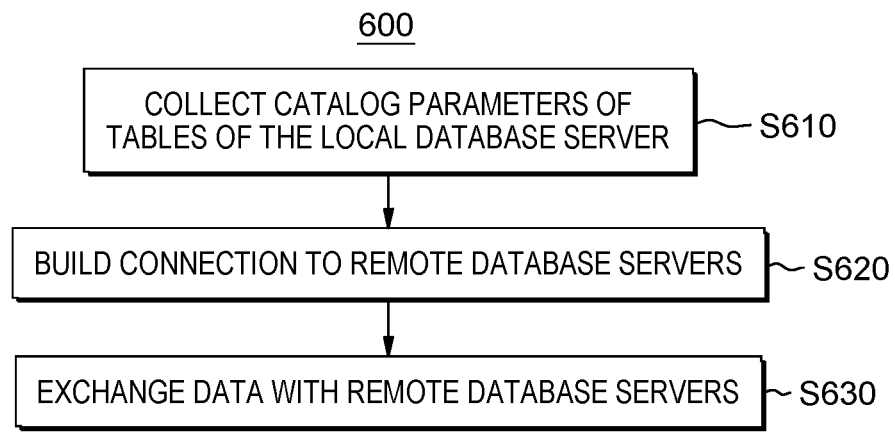
FIG. 6 shows a flow chart of an exemplary method for data interaction across different database servers through distributed catalog agents according to some embodiments of the present invention.

Now refer to FIG. 6, which shows a flow chart of an exemplary method 600 for data interaction across different database servers through distributed catalog agents according to some embodiments of the present invention.

In some embodiments, distributed catalog agents may be implemented for each distributed database server. For example, as shown in FIG. 4, catalog agent 408 is implemented for database 1 and catalog agent 410 is implemented for database 2. Further, for the data virtualization layer 200, a catalog agent 406 may be implemented. The catalog agent 406 may have similar functions as the catalog agent 408 and 410 of the database servers.

As shown in FIG. 6, in S610, a catalog agent of a database server collects catalog parameters of tables of the database server. In the following description, the database server in which the catalog agent is implemented is also recited as the local database server, and other database servers with which the catalog agent exchanges data are recited as remote database servers.

In some embodiments, the catalog parameters of the tables of the local database server may include the statistic information of the tables, the performance information of the local database server or any other necessary information. In some embodiments, the catalog parameter may further include location information of the local database server, such as a server Internet Protocol (IP) address and a server port.

In S620, the catalog agent may build a connection to remote database servers (or the data virtualization layer) for data exchange. For example, the catalog agent may send a command to build the connection.

In S630, the catalog agent may exchange data with the remote database servers (or the data virtualization layer) through the built connection. In some embodiments, performance information (such as CPU status, memory status, disk utilization) of the remote database servers may be obtained and stored as catalog parameters in the catalog agent. Further, the catalog agent may transmit a testing signal periodically to each remote database server, and determine the network latency with the remote database server by receiving a feedback signal for the testing signal. The network latencies with the remote database servers may also be stored in the catalog agent as catalog parameters. In some embodiments, in S530 of the method 500, the network latencies for calculating the query cost may be obtained from the stored catalog parameters.

In some embodiments, the catalog agent may be implemented based on Java, bundled with Java DataBase Connectivity (JDBC) driver, which may act like a client. The catalog agent may also map tables in other database servers into virtual tables in the local database server. Further, the catalog agent may receive SQLs from the data virtualization layer 200 or other catalog agent of remote database servers, parse the SQLs, and translate the SQLs to remote database servers based on the query plan. Moreover, the join work for multiple tables described above may also be performed by the catalog agent.

Based on the method 600, each distributed catalog agent for the local database server may not only store the information of the local database server, but also performance information of remote database servers and network latencies with remote database servers. In some embodiments, in method S500, at least one of the statistic information, the performance information and the network latencies may be obtained from the distributed catalog agent for calculating the query cost.

Further, in some embodiments, during query planning based on the join query request, the distributed catalog parameters may be analyzed to facilitate the processes of at least one of query rewrite/optimization preparation for rewriting statements (such as SQLs) generated by the application, plan optimization for obtaining an optimized query plan and statement generation for generating statements for performing the optimized query plan.

It should be noted that the processing of cross-database join query according to embodiments of this disclosure could be implemented in the computing environment of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

According to an embodiment of the present disclosure, there is provided a system for cross-database join query. The system may comprise one or more processing units and a memory coupled to at least one of the one or more processing units. The system may further comprise a set of computer program instructions stored in the memory and executed by at least one of the one or more processing units in order to perform actions including receiving, at a data virtualization layer (DV), a join query request related to a plurality of tables $\{T_1, T_2 \ldots, T_n\}$ respectively stored in a plurality of distributed database servers $\{S_1, S_2, \ldots, S_n\}$, wherein n is an integer larger than 1; generating a plurality of candidate query plans for the join query request, each of the plurality of candidate query plans indicating an order for transmitting the tables $\{T_1, T_2, \ldots, T_n\}$ respectively stored in the database servers $\{S_1, S_2, \ldots, S_n\}$ to the DV, wherein for one candidate query plan $P=\{S_i \rightarrow S_j \rightarrow \ldots S_n \rightarrow \ldots, \rightarrow DV\}$, $1 \leq i, j \leq n$, table $T_i$ stored in database server $S_i$ is transmitted to and stored in database server $S_j$ before being transmitted together with table $T_j$ which is stored in database server $S_j$ to a next database server, and wherein in at least one of the database servers $\{S_1, S_2, \ldots, S_n\}$, a join work is performed on the stored tables based on the join query request before being transmitted to the next database server; for each of the plurality of candidate query plans, calculating a query cost for the candidate query plan based on a data amount of the tables to be transmitted according to the candidate query plan; and determining from the plurality of candidate query plans, a query plan for the join query request which has a lowest query cost.

According to an embodiment of the present disclosure, there is provided a computer program product. The computer program product may comprise a computer readable storage medium having program instructions embodied therewith. The program instructions may be executable by a device to perform a method. The method may comprise receiving, at a data virtualization layer (DV), a join query request related to a plurality of tables $\{T_1, T_2, \ldots, T_n\}$ respectively stored in a plurality of distributed database servers $\{S_1, S_2, \ldots, S_n\}$, wherein n is an integer larger than 1; generating a plurality of candidate query plans for the join query request, each of the plurality of candidate query plans indicating an order for transmitting the tables $\{T_1, T_2, \ldots, T_n\}$ respectively stored in the database servers $\{S_1, S_2, \ldots, S_n\}$ to the DV, wherein for one candidate query plan $P=\{S_i \to S_j \to \ldots S_n \to, \ldots, \to DV\}$. $1 \le i, j \le n$, table $T_i$ stored in database server $S_i$ is transmitted to and stored in database server $S_j$ before being transmitted together with table $T_j$ which is stored in database server $S_j$ to a next database server, and wherein in at least one of the database servers $\{S_1, S_2, \ldots, S_n\}$, a join work is performed on the stored tables based on the join query request before being transmitted to the next database server; for each of the plurality of candidate query plans, calculating a query cost for the candidate query plan based on a data amount of the tables to be transmitted according to the candidate query plan; and determining from the plurality of candidate query plans, a query plan for the join query request which has a lowest query cost.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving at a data virtualization layer (DV), by one or more processors, a join query request related to a plurality of tables $\{T_1, T_2, \ldots, T_n\}$ respectively stored in a plurality of distributed database servers $\{S_1, S_2, \ldots, S_n\}$, wherein n is an integer larger than 1;
   implementing a catalog agent for the data virtualization layer;
   mapping tables, using the catalog agent, in the next database server into virtual tables;
   generating, by the one or more processors, a plurality of candidate query plans for the join query request, each of the plurality of candidate query plans indicating an order for transmitting the tables $\{T_1, T_2, \ldots, T_n\}$ respectively stored in the database servers $\{S_1, S_2, \ldots, S_n\}$ to the DV, wherein for one candidate query plan $P=\{S_i \to S_j \to \ldots S_n \to, \ldots, \to DV\}$, $1 \le i, j \le n$, table $T_i$ stored in database server $S_i$ is transmitted to and stored in database server $S_j$ before being transmitted together with table $T_j$ which is stored in database server $S_j$ to a next database server, and wherein in at least one of the database servers $\{S_1, S_2, \ldots, S_n\}$, a join work is performed on the stored tables based on the join query request before being transmitted to the next database server, the join work being performed by the catalog agent;
   for each of the plurality of candidate query plans, calculating, by the one or more processors, a query cost for the candidate query plan based on a data amount of the tables to be transmitted according to the candidate query plan; and
   determining, by the one or more processors, from the plurality of candidate query plans, a query plan for the join query request which has a lowest query cost.

2. The computer-implemented method of claim 1, wherein the data amount of the tables to be transmitted is determined based on statistic information of the tables $\{T_1, T_2, \ldots, T_n\}$, the statistic information of the tables $\{T_1, T_2, \ldots, T_n\}$ being respectively obtained from the database servers $\{S_1, S_2, \ldots, S_n\}$.

3. The computer-implemented method of claim 1, wherein the query cost for the candidate query plan is further calculated based on a processing rate of the database servers $\{S_1, S_2, \ldots, S_n\}$.

4. The computer-implemented method of claim 3, wherein the processing rate is determined by performance information of the at least one of the database servers $\{S_1, S_2, \ldots, S_n\}$ in which the join work is performed, the performance information being obtained from catalog parameters stored in respective database servers $\{S_1, S_2, \ldots, S_n\}$.

5. The computer-implemented method of claim 4, wherein the performance information is indicated by at least one of a CPU status, a memory status, a disk utilization of the at least one of the database servers $\{S_1, S_2, \ldots, S_n\}$.

6. The computer-implemented method of claim 1, wherein the query cost for the candidate query plan is further calculated based on network latencies for transmitting the tables $\{T_1, T_2, \ldots, T_n\}$ respectively stored in the database servers $\{S_1, S_2, \ldots, S_n\}$ to the DV based on the candidate query plan.

7. The computer-implemented method of claim 6, wherein for one database server included in the database servers $\{S_1, S_2, \ldots, S_n\}$, the network latencies with other database servers and DV are obtained from catalog parameters stored in the one database server.

8. The computer-implemented method of claim 1, wherein the method further comprises:
   fetching, by the one or more processors, data related to the join query request based on the determined query plan.

9. A system comprising:
   one or more processors;
   a memory coupled to at least one of the one or more processors;
   a set of computer program instructions stored in the memory and executed by at least one of the one or more processors in order to perform actions of:
   receiving, at a data virtualization layer (DV), a join query request related to a plurality of tables $\{T_1, T_2, \ldots, T_n\}$ respectively stored in a plurality of distributed database servers $\{S_1, S_2, \ldots, S_n\}$, wherein n is an integer larger than 1;
   implementing a catalog agent for the data virtualization layer;
   mapping tables, using the catalog agent, in the next database server into virtual tables;
   generating a plurality of candidate query plans for the join query request, each of the plurality of candidate query plans indicating an order for transmitting the tables $\{T_1, T_2, \ldots, T_n\}$ respectively stored in the database servers $\{S_1, S_2, \ldots, S_n\}$ to the DV, wherein for one candidate query plan $P=\{S_i \rightarrow S_j \rightarrow, \ldots, S_n \rightarrow, \ldots, \rightarrow DV\}$, $1 \leq i, j \leq n$, table $T_i$ stored in database server $S_i$ is transmitted to and stored in database server $S_j$ before being transmitted together with table $T_j$ which is stored in database server $S_j$ to a next database server, and wherein in at least one of the database servers $\{S_1, S_2, \ldots, S_n\}$, a join work is performed on the stored tables based on the join query request before being transmitted to the next database server, the join work being performed by the catalog agent;

for each of the plurality of candidate query plans, calculating a query cost for the candidate query plan based on a data amount of the tables to be transmitted according to the candidate query plan; and determining from the plurality of candidate query plans, a query plan for the join query request which has a lowest query cost.

10. The system of claim 9, wherein the data amount of the tables to be transmitted is determined based on statistic information of the tables $\{T_1, T_2, \ldots, T_n\}$, the statistic information of the tables $\{T_1, T_2, \ldots, T_n\}$ being respectively obtained from the database servers $\{S_1, S_2, \ldots, S_n\}$.

11. The system of claim 9, wherein the query cost for the candidate query plan is further calculated based on a processing rate of the database servers $\{S_1, S_2, \ldots, S_n\}$.

12. The system of claim 11, wherein the processing rate is determined by performance information of the at least one of the database servers $\{S_1, S_2, \ldots, S_n\}$ in which the join work is performed, the performance information being obtained from catalog parameters stored in respective database servers $\{S_1, S_2, \ldots, S_n\}$.

13. The system of claim 12, wherein the performance information is indicated by at least one of a CPU status, a memory status, a disk utilization of the at least one of the database servers $\{S_1, S_2, \ldots, S_n\}$.

14. The system of claim 9, wherein the query cost for the candidate query plan is further calculated based on network latencies for transmitting the tables $\{T_1, T_2, \ldots, T_n\}$ respectively stored in the database servers $\{S_1, S_2, \ldots, S_n\}$ to the DV based on the candidate query plan.

15. A computer program product comprising a computer readable storage medium having program instructions embodied therewith, wherein the program instructions being executable by a device to perform a method comprising:

receiving, at a data virtualization layer (DV), a join query request related to a plurality of tables $\{T_1, T_2, \ldots, T_n\}$ respectively stored in a plurality of distributed database servers $\{S_1, S_2, \ldots, S_n\}$, wherein n is an integer larger than 1;

implementing a catalog agent for the data virtualization layer;

mapping tables, using the catalog agent, in the next database server into virtual tables;

generating a plurality of candidate query plans for the join query request, each of the plurality of candidate query plans indicating an order for transmitting the tables $\{T_1, T_2, \ldots, T_n\}$ respectively stored in the database servers $\{S_1, S_2, \ldots, S_n\}$ to the DV, wherein for one candidate query plan $P=\{S_i \rightarrow S_j \rightarrow \ldots S_n \rightarrow, \ldots, \rightarrow DV\}$, $1 \leq i, j \leq n$, table $T_i$ stored in database server $S_i$ is transmitted to and stored in database server $S_j$ before being transmitted together with table $T_j$ which is stored in database server $S_j$ to a next database server, and wherein in at least one of the database servers $\{S_1, S_2, \ldots, S_n\}$, a join work is performed on the stored tables based on the join query request before being transmitted to the next database server, the join work being performed by the catalog agent;

for each of the plurality of candidate query plans, calculating a query cost for the candidate query plan based on a data amount of the tables to be transmitted according to the candidate query plan; and determining from the plurality of candidate query plans, a query plan for the join query request which has a lowest query cost.

16. The computer program product of claim 15, wherein the data amount of the tables to be transmitted is determined based on statistic information of the tables $\{T_1, T_2, \ldots, T_n\}$, the statistic information of the tables $\{T_1, T_2, \ldots, T_n\}$ being respectively obtained from the database servers $\{S_1, S_2, \ldots, S_n\}$.

17. The computer program product of claim 15, wherein the query cost for the candidate query plan is further calculated based on a processing rate of the database servers $\{S_1, S_2, \ldots, S_n\}$.

18. The computer program product of claim 17, wherein the processing rate is determined by performance information of the at least one of the database servers $\{S_1, S_2, \ldots, S_n\}$ in which the join work is performed, the performance information being obtained from catalog parameters stored in respective database servers $\{S_1, S_2, \ldots, S_n\}$.

19. The computer program product of claim 18, wherein the performance information is indicated by at least one of a CPU status, a memory status, a disk utilization of the at least one of the database servers $\{S_1, S_2, \ldots, S_n\}$.

20. The computer program product of claim 15, wherein the query cost for the candidate query plan is further calculated based on network latencies for transmitting the tables $\{T_1, T_2, \ldots, T_n\}$ respectively stored in the database servers $\{S_1, S_2, \ldots, S_n\}$ to the DV based on the candidate query plan.

* * * * *